(12) United States Patent
Kurata et al.

(10) Patent No.: US 9,947,929 B2
(45) Date of Patent: Apr. 17, 2018

(54) BINDER COMPOSITION FOR NONAQUEOUS BATTERY ELECTRODES, SLURRY FOR NONAQUEOUS BATTERY ELECTRODES, NONAQUEOUS BATTERY ELECTRODE, AND NONAQUEOUS BATTERY

(71) Applicant: SHOWA DENKO K.K., Tokyo (JP)

(72) Inventors: Tomonori Kurata, Tatsuno (JP); Mitsuru Hanasaki, Himeji (JP); Junya Uchiyashiki, Himeji (JP)

(73) Assignee: SHOWA DENKO K.K., Tokyo (JP)

( * ) Notice: Subject to any disclaimer, the term of this patent is extended or adjusted under 35 U.S.C. 154(b) by 212 days.

(21) Appl. No.: 15/024,444

(22) PCT Filed: Jun. 20, 2014

(86) PCT No.: PCT/JP2014/066413
§ 371 (c)(1),
(2) Date: Mar. 24, 2016

(87) PCT Pub. No.: WO2015/045522
PCT Pub. Date: Apr. 2, 2015

(65) Prior Publication Data
US 2016/0248095 A1   Aug. 25, 2016

(30) Foreign Application Priority Data

Sep. 27, 2013  (JP) .................................. 2013-201056

(51) Int. Cl.
| | | |
|---|---|---|
| *H01M 4/62* | (2006.01) | |
| *C08L 1/02* | (2006.01) | |
| *C08L 71/02* | (2006.01) | |
| *H01M 4/137* | (2010.01) | |
| *H01M 4/1399* | (2010.01) | |
| *H01M 4/13* | (2010.01) | |

(52) U.S. Cl.
CPC ............... *H01M 4/622* (2013.01); *C08L 1/02* (2013.01); *C08L 71/02* (2013.01); *H01M 4/13* (2013.01); *H01M 4/137* (2013.01); *H01M 4/1399* (2013.01)

(58) Field of Classification Search
CPC .......... C08L 1/02; C08L 71/02; H01M 4/137; H01M 4/1399; H01M 4/622; H01M 4/13
See application file for complete search history.

(56) References Cited

U.S. PATENT DOCUMENTS

| | | | |
|---|---|---|---|
| 9,147,882 B2* | 9/2015 | Hanasaki | H01M 4/622 |
| 2007/0191507 A1* | 8/2007 | Sugimoto | C09D 11/30 523/160 |
| 2013/0119318 A1* | 5/2013 | Hanasaki | H01M 4/622 252/500 |
| 2014/0248534 A1* | 9/2014 | Chikugo | H01M 4/13 429/212 |
| 2016/0248095 A1* | 8/2016 | Kurata | H01M 4/13 |

FOREIGN PATENT DOCUMENTS

| | | |
|---|---|---|
| JP | 2000-299109 A | 10/2000 |
| JP | 2002-158012 A | 5/2002 |
| JP | 2011-243464 A | 12/2011 |
| WO | 2012/144439 A1 | 10/2012 |
| WO | 2013/069280 A1 | 5/2013 |
| WO | 2014/024823 A1 | 2/2014 |

OTHER PUBLICATIONS

International Search Report for PCT/JP2014/066413 dated Jul. 29, 2014.

* cited by examiner

*Primary Examiner* — Michael A Salvitti
(74) *Attorney, Agent, or Firm* — Sughrue Mion, PLLC

(57) ABSTRACT

A binder composition for nonaqueous battery electrodes is prepared by adding a small amount of an acetylene glycol compound to an aqueous polymer emulsion obtained by emulsion polymerization of a monomer mixture comprising from 15 to 70% by mass of styrene (a), from 20 to 80% by mass of an ethylenically unsaturated carboxylate (b), from 1 to 10% by mass of an ethylenically unsaturated carboxylic acid (c), from 0.1 to 5% by mass of a crosslinkable ethylenically unsaturated monomer (d), and from 0 to 20% by mass of another monoethylenically unsaturated monomer (e). When the above binder composition is used, an active material is not peeled off in the step of cutting a collector even when a small amount of the binder is used, and a nonaqueous battery excellent in a charge-discharge cycle property can be produced.

15 Claims, No Drawings

BINDER COMPOSITION FOR NONAQUEOUS BATTERY ELECTRODES, SLURRY FOR NONAQUEOUS BATTERY ELECTRODES, NONAQUEOUS BATTERY ELECTRODE, AND NONAQUEOUS BATTERY

CROSS REFERENCE TO RELATED APPLICATIONS

This application is a National Stage of International Application No. PCT/JP2014/066413 filed Jun. 20, 2014, claiming priority based on Japanese Patent Application No. 2013-201056 filed Sep. 27, 2013, the contents of all of which are incorporated herein by reference in their entirety.

TECHNICAL FIELD

The present invention relates to a binder composition for nonaqueous battery electrodes used for forming an electrode of a nonaqueous battery, a slurry obtained by using the binder composition for the electrodes, a nonaqueous battery electrode obtained by using the slurry, and a nonaqueous battery obtained by using the nonaqueous battery electrode.

BACKGROUND ART

In recent years, the development of nonaqueous batteries typified by lithium ion secondary batteries has been energetically performed. Since the nonaqueous batteries contribute to reduction in size and weight of power sources, they are used as power sources for many products such as notebook personal computers, mobile telephones, electric power tools, and electronic communications equipment, and recently have attracted attention also as environmentally friendly power sources for vehicles in which the amount of emission of harmful substances is small, such as electric vehicles and hybrid electric vehicles. However, conventionally known nonaqueous batteries are not necessarily sufficient in terms of output, capacity, and life, and higher output, higher capacity, and longer life are required.

The nonaqueous battery is a secondary battery comprising a positive electrode using a metal oxide or the like as an active material, a negative electrode using a carbon material such as graphite as an active material, and an electrolyte solvent such as carbonates and a flame-retardant ionic liquid, in which charge and discharge of a battery is performed by the movement of ions between the positive electrode and the negative electrode. Generally, the positive electrode is obtained by coating the surface of a positive electrode collector such as aluminum foil with a slurry comprising a metal oxide and a binder, drying the coating, and then cutting the coated positive electrode collector to a suitable size. The negative electrode is obtained by coating the surface of a negative electrode collector such as copper foil with a slurry comprising a carbon material and a binder, drying the coating, and then cutting the coated negative electrode collector to a suitable size. Therefore, each binder has a role of binding active materials to each other and binding an active material to a collector to prevent peeling of active materials from a collector.

As the binder, a polyvinylidene fluoride (PVDF)-based binder using N-methyl pyrrolidone (NMP) of an organic solvent system as a solvent is well known. However, this binder has a low binding property between active materials and between an active material and a collector, and a large amount of binder is required for practical use. As a result, the capacity of the resulting nonaqueous battery is reduced, which is a defect. In addition, since expensive and poisonous NMP is used as a solvent for binders, there is a problem also in the price of end products and the preservation of work environment during the production of a slurry or a collector.

As a method for solving these problems, the development of a water-dispersed binder has been advanced. For example, there is known a styrene-butadiene rubber (SBR)-based aqueous dispersion in which carboxymethyl cellulose (CMC) is used in combination as a thickener. Since this SBR-based dispersion is an aqueous dispersion, it is inexpensive and advantageous from the point of view of the preservation of work environment. Further, since the binding property between active materials and between an active material and a collector is relatively satisfactory, electrodes can be produced by using a smaller amount of the SBR-based dispersion than the amount of the PVDF-based binder. As a result, there is an advantage that higher output and higher capacity of nonaqueous batteries can be achieved. From these advantages, the SBR-based dispersion is widely used as a binder for nonaqueous battery electrodes.

However, also in this binder, the binding property between active materials and between an active material and a collector is not necessarily sufficient, and when an electrode is produced with a small amount of binder, a part of an active material is peeled off in the step of cutting a collector, which is problematic. Further, when the SBR-based binder is used, the resistance value of the resulting nonaqueous battery tends to be high. As a result, there is a problem that higher output and longer life cannot be achieved.

The research to aim at the improvement in performance of the water-dispersed binder typified by SBR has been advanced under such a background. For example, for the purpose of improving the charge-discharge cycle property of an electrode, there is proposed a method involving adding acetylene glycol or a derivative thereof when a water-dispersed binder is mixed with an active material (PTL 1). According to this method, the water-dispersed binder is used in an amount of 2 to 15 parts by mass in terms of solids per 100 parts by mass of the active material, and acetylene glycol or a derivative thereof is formulated into a dilute isopropanol solution and added to the mixing system at the stage after mixing the active material, the binder, and other components (refer to paragraph 0039 and paragraph 0046). Further, it is disclosed that the amount of acetylene glycol or a derivative thereof to be mixed is from 20 to 5,000 ppm in a slurry containing the active material (refer to paragraph 0018).

In addition, Examples in PTL 1 disclose that when an acetylene glycol derivative (having a content in slurry of 150 ppm) is used in combination with a binder (having a polymer content of 3 parts by mass) in which a polymer latex essentially comprising styrene, butadiene, and methyl methacrylate is used, the capacity retention has been improved from 78% to 82% in the charge and discharge cycle test of 30 cycles (refer to paragraph 0042, Example 1, and paragraph 0052, Example 4). However, since the binder and acetylene glycol or a derivative thereof are separately added in the preparation of the slurry, there is a concern that both the components cannot necessarily be sufficiently mixed in the mixing system. In addition, since acetylene glycol or a derivative thereof is formulated into an isopropanol solution and then used, an appearance defect of electrodes resulting from isopropanol easily occurs. In addition to these problems, since the amount of the binder used relative to that of the electrode active material is large, a battery obtained by using this slurry has high internal resistance and is insufficient also in terms of a charge-discharge cycle property.

On the other hand, PTL 2 proposes a method involving using a non-diene-based polymer essentially comprising styrene and an ethylenically unsaturated carboxylic ester as a water-dispersed binder instead of conventional SBR. It is disclosed that when this binder is used, the binding property between active materials and between an active material and a collector is satisfactory, and that a charge-discharge cycle property is improved. In an Example, 90% by mass of the active material and 2% by mass of the binder (in terms of non-volatile matter) are mixed to prepare a slurry (refer to paragraph 0073, Example 1). Similar to the case of PTL 1, the battery manufactured using this slurry has a problem derived from the fact that the amount of the binder used is large, and for example, a problem is that internal resistance increases. Particularly, when a cycle test is performed, a poor cycle property is easily observed because the internal resistance easily increases to cause reduction in voltage. In addition, there was room for improvement in the binding property between active materials.

CITATION LIST

Patent Literature

PTL 1: Japanese Patent Laid-Open No. 2002-158012
PTL 2: Japanese Patent Laid-Open No. 2011-243464

SUMMARY OF INVENTION

Technical Problem

An object of the present invention is to solve prior art problems as described above and provide a binder composition for nonaqueous battery electrodes, which is water-dispersed, has a good binding property between an active material and a collector and particularly between active materials, in which an active material is not peeled off in the step of cutting a collector even when an electrode is produced using a small amount of binder, and which allows the production of a nonaqueous battery excellent in a charge-discharge cycle property. In addition, another object of the present invention is to provide a slurry using the binder composition, an electrode using the slurry, and a nonaqueous battery having a low internal resistance value and an excellent charge-discharge cycle property using the electrode.

Solution to Problem

The present inventors have assiduously studied for the purpose of solving the above-mentioned problems and, as a result, have found the followings: when there is used a binder composition prepared by adding a specific amount of acetylene glycol or a derivative of acetylene glycol to an emulsion obtained by emulsion polymerization of an ethylenically unsaturated monomer mixture comprising styrene, an ethylenically unsaturated carboxylate, an ethylenically unsaturated carboxylic acid and a crosslinkable ethylenically unsaturated monomer in the presence of a surfactant, the adhesion between an active material and metal foil such as copper foil used as a collector and the binding strength between active materials are improved; and when this binder composition for electrodes is used at a specific ratio to an active material to prepare a slurry, followed by manufacturing an electrode using the slurry and manufacturing a nonaqueous battery using the electrode, the resistance value of the battery is reduced, and a charge-discharge cycle property is also improved. Thus, the present invention has been completed.

Thus, the present invention provides, as a first invention, a binder composition for nonaqueous battery electrodes prepared by adding an acetylene glycol compound represented by the formula (1) described below to an aqueous polymer emulsion, wherein the aqueous polymer emulsion is obtained by emulsion polymerization of a monomer mixture comprising from 15 to 70% by mass of styrene (a), from 20 to 80% by mass of an ethylenically unsaturated carboxylate (b), from 1 to 10% by mass of an ethylenically unsaturated carboxylic acid (c), from 0.1 to 5% by mass of a crosslinkable ethylenically unsaturated monomer (d), and from 0 to 20% by mass of another monoethylenically unsaturated monomer (e), and from 0.02 to 0.7 part by mass of the acetylene glycol compound is added to 100 parts by mass of non-volatile matter of the aqueous polymer emulsion.

Further, the present invention provides, as a second invention, a slurry for nonaqueous battery electrodes comprising an electrode active material and the above binder composition for nonaqueous battery electrodes, wherein the electrode active material/non-volatile matter of the binder composition (mass ratio) is from 100/0.1 to 100/1.8. Furthermore, the present invention provides, as a third invention, a nonaqueous battery electrode formed by using the slurry for nonaqueous battery electrodes and, as a fourth invention, a nonaqueous battery comprising the nonaqueous battery electrode.

Advantageous Effects of Invention

The binder composition for nonaqueous battery electrodes of the present invention is excellent in the binding property between active materials and between an active material and a collector as compared with conventional water-dispersed binders, and even if the content of a polymer for binders in a slurry is reduced, the active material is hardly peeled off from a collector surface in the step of cutting an electrode to be performed after coating the collector surface with the slurry containing the active material followed by drying. Further, since the amount of the polymer for binders relative to the active material can be reduced, the nonaqueous battery obtained by using such a binder composition for nonaqueous battery electrodes has a low resistance value and exhibits an excellent cycle property even in the charge and discharge cycle test under a severe condition of 300 cycles.

DESCRIPTION OF EMBODIMENTS

"Binder Composition for Nonaqueous Battery Electrodes"

The binder composition for nonaqueous battery electrodes of the present invention (hereinafter sometimes abbreviated as a "binder" or a "binder composition") is prepared by adding acetylene glycol or a derivative thereof (hereinafter sometimes collectively referred to as an "acetylene glycol compound") to an aqueous polymer emulsion obtained by emulsion polymerization of a monomer mixture comprising a specific amount of styrene, an ethylenically unsaturated carboxylate, an ethylenically unsaturated carboxylic acid, a crosslinkable ethylenically unsaturated monomer, and an optionally used another monoethylenically unsaturated monomer in the presence of a surfactant. The method of blending the acetylene glycol compound with the aqueous polymer emulsion is not particularly limited. However, since the amount of the acetylene glycol compound added is small, the compound is desirably thoroughly mixed during or after addition to uniformly disperse the same. Further, some acetylene glycol derivatives can be used as a surfactant of emulsion polymerization, and when such a derivative is used as a surfactant of emulsion polymerization, a target mixture can be obtained through the process of polymerization.

(Acetylene Glycol or Derivative Thereof)

The acetylene glycol to be used is a compound having an acetylene skeleton and one hydroxyl group on each of two carbon atoms adjacent to carbon atoms forming the acetylene skeleton. Further, the derivative thereof is a compound obtained by modifying at least one of the hydroxyl groups with an ether bond or an ester bond. A preferred acetylene glycol is a compound represented by the following formula (1), more preferably a compound represented by the following formula (2). Note that in the following formulas (1) and (2), the notation of the carbon atoms forming the acetylene skeleton and the two carbon atoms adjacent thereto has been simplified.

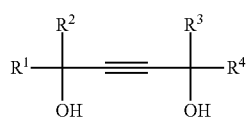

(1)

wherein $R^1$ to $R^4$ each independently represent a hydrogen atom or an alkyl group having from 1 to 8 carbon atoms. The alkyl group may be linear or branched. Specific examples thereof include a methyl group, an ethyl group, a propyl group, a n-butyl group, a sec-butyl group, a n-pentyl group, and a n-hexyl group. Among them, an alkyl group having from 1 to 4 carbon atoms is preferably used.

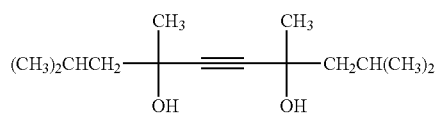

(2)

Examples of the acetylene glycol represented by formula (2) that can be used include Surfynol 104 (Nissin Chemical Industry Co., Ltd.) which is a commercially available product.

A preferred acetylene glycol derivative used in the present invention includes a compound in which at least one, preferably both of the two hydroxyl groups in the above formula (1) are modified with an ether bond, specifically a compound in which alkylene oxides each having 2 to 4 carbon atoms or oligomers thereof are added to the two hydroxyl groups. Specific examples of the alkylene oxide include ethylene oxide, propylene oxide, and butylene oxide. Further, when an oligomer is used, the oligomer has a degree of polymerization of 2 to 40, preferably 2 to 30. Among them, ethylene oxide or an oligomer thereof is preferably used.

Particularly, a compound represented by the following formula (3) is preferred, and specific examples that can be used include Surfynol 440 (Nissin Chemical Industry Co., Ltd.) which is a commercially available product.

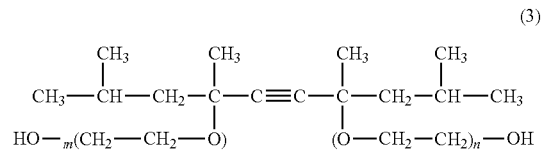

(3)

wherein m and n each represent an integer of from 1 to 30. Preferably, the sum of m and n is from 2 to 10.

In the present invention, it is required to mix the acetylene glycol compound at a proportion of from 0.02 to 0.7 part by mass, preferably from 0.05 to 0.6 part by mass, most preferably from 0.1 to 0.5 part by mass, per 100 parts by mass of the non-volatile matter of the aqueous polymer emulsion. If the amount of the acetylene glycol compound used is less than 0.02 part by mass, sufficient binding strength will not be obtained, and the life property of the resulting battery during the charge and discharge cycle will not be improved. Further, if the amount of the acetylene glycol compound used is more than 0.7 part by mass, the amount of the compound that flows out into an injected electrolytic solution will increase to thereby easily increase internal resistance, particularly solution resistance.

The polymer component used in the binder composition of the present invention is an aqueous polymer emulsion obtained by emulsion polymerization of an ethylenically unsaturated monomer mixture comprising from 15 to 70% by mass of styrene (a), from 20 to 80% by mass of an ethylenically unsaturated carboxylate (b), from 1 to 10% by mass of an ethylenically unsaturated carboxylic acid (c), from 0.1 to 5% by mass of a crosslinkable ethylenically unsaturated monomer (d), and from 0 to 20% by mass of another monoethylenically unsaturated monomer (e).

The amount of styrene used is from 15 to 70% by mass, preferably from 30 to 60% by mass, based on all the ethylenically unsaturated monomers. If a polymer in which the amount of styrene used is less than 15% by mass is used as a polymer component of a binder composition, the binder composition will be poor in the binding property between active materials, and the adhesion between an active material and a collector will be significantly reduced. On the other hand, if a polymer in which the amount of styrene used is more than 70% by mass is used, a crack will easily occur in an electrode obtained by applying a slurry containing the binder composition and an active material since the glass transition temperature (Tg) of the polymer will be excessively high. The effect of improvement in the binding property by incorporating styrene at the above proportion is significant particularly when a carbon material such as graphite is used as an active material.

The amount of the ethylenically unsaturated carboxylate used as the component (b) of the polymer for binders is from 20 to 80% by mass, preferably from 30 to 70% by mass, based on all the ethylenically unsaturated monomers. If the amount of the ethylenically unsaturated carboxylate used is less than 20% by mass, the resulting binder will be poor in elution resistance, and if the amount of the ethylenically unsaturated carboxylate used is more than 80% by mass conversely, the resulting binder will have significantly reduced adhesion between active materials and between an active material and a collector. Examples of the ethylenically unsaturated carboxylate used include (meth)acrylates such as methyl (meth)acrylate, ethyl (meth)acrylate, n-propyl (meth)acrylate, isopropyl (meth)acrylate, n-butyl (meth) acrylate, iso-butyl (meth)acrylate, tert-butyl (meth)acrylate, n-hexyl (meth)acrylate, 2-ethylhexyl (meth)acrylate, lauryl (meth)acrylate, stearyl (meth)acrylate, cyclohexyl (meth) acrylate, isononyl (meth)acrylate, isobornyl (meth)acrylate, and benzyl (meth)acrylate, vinyl acetate, and vinyl propionate. Among these ethylenically unsaturated carboxylates, n-butyl (meth)acrylate, 2-ethylhexyl (meth)acrylate, and lauryl (meth)acrylate are preferably used from the point of view of the ease of emulsion polymerization and elution resistance.

Note that the term "(meth)acrylic acid" in the present specification means that it may be any of acrylic acid and methacrylic acid, and the term "(meth)acrylate" or "(meth) acrylamide" also means that it may be an ester or an amide, respectively, of any of acrylic acid and methacrylic acid.

Further, the ethylenically unsaturated carboxylate may have a polar group, and specific examples thereof include ethylenically unsaturated carboxylates having a polar group such as a hydroxy group and a glycidyl group. More specific examples include 2-hydroxyalkyl (meth)acrylates such as 2-hydroxyethyl (meth)acrylate and 2-hydroxypropyl (meth) acrylate and glycidyl acrylate. Among these, 2-hydroxyethyl (meth)acrylate is preferably used.

When the ethylenically unsaturated carboxylate having a polar group is used as a part of ethylenically unsaturated carboxylates, it is preferably used in a proportion of from 0.1 to 10% by mass, more preferably from 0.5 to 5% by mass, based on all the ethylenically unsaturated monomers. If the amount of the ethylenically unsaturated carboxylic acid having a polar group used is less than 0.1% by mass, the emulsion polymerization stability or mechanical stability will be reduced, and the swelling resistance of a dry film in an electrolytic solution tends to be reduced. If the amount of the ethylenically unsaturated carboxylic acid having a polar group used is more than 10% by mass, the binding property between active materials and between an active material and a collector tends to be reduced.

The amount of the ethylenically unsaturated carboxylic acid used as the component (c) of the polymer for binders is from 1 to 10% by mass, preferably from 2 to 8% by mass, more preferably from 3 to 6% by mass, based on all the ethylenically unsaturated monomers. When the content of the ethylenically unsaturated carboxylic acid is set to 1% by mass or more, the emulsion polymerization stability and mechanical stability will be improved, and the binding property between active materials and between an active material and a collector will be improved. Further, when the content of the ethylenically unsaturated carboxylic acid is set to 10% by mass or less, the binding property between active materials and between an active material and a collector will be improved.

Specific examples of the ethylenically unsaturated carboxylic acid used include unsaturated monocarboxylic acids such as acrylic acid, methacrylic acid, and crotonic acid, unsaturated dicarboxylic acids such as maleic acid, fumaric acid, and itaconic acid, and half esters of these unsaturated dicarboxylic acids. Among these, acrylic acid and itaconic acid are preferred from the point of view of the improvement in the binding property between active materials and between an active material and a collector. These ethylenically unsaturated carboxylic acids may be contained singly or in combination of two or more.

Examples of the crosslinkable ethylenically unsaturated monomer (hereinafter sometimes referred to as "internal crosslinking agent") used as the component (d) of the polymer for binders include (i) a monomer having at least one ethylenically unsaturated bond and having a reactive group which has reactivity with other functional groups such as a carboxyl group derived from the above component (c), and a hydroxy group and a glycidyl group derived from the above component (b); and (ii) a monomer having two or more ethylenically unsaturated bonds. Specific examples of (i) include silane coupling agents having at least one ethylenically unsaturated bond in addition to a reactive functional group, such as vinyltrimetoxysilane, vinyltriethoxysilane, γ-methacryloxypropyltrimethoxysilane, and γ-methacryloxypropyltriethoxysilane. Further, specific examples of (ii) include divinylbenzene, ethylene glycol di(meth)acrylate, trimethylolpropane tri(meth)acrylate, and triallyl cyanurate.

Among these internal crosslinking agents, divinylbenzene, trimethylolpropane tri(meth)acrylate, vinyltrimetoxysilane, or vinyltriethoxysilane is preferably used, and divinylbenzene is more preferably used. These internal crosslinking agents may be contained singly or in combination of two or more in the ethylenically unsaturated monomers.

The content of the internal crosslinking agent is from 0.1 to 5% by mass, preferably from 0.1 to 3% by mass, more preferably from 0.2 to 2% by mass, based on all the ethylenically unsaturated monomers. If the content of the internal crosslinking agent is set to less than 0.1% by mass, the binder easily flows out into an electrolytic solution to increase the resistance value of a lithium ion secondary battery, and it will be difficult for the lithium ion secondary battery to have higher output and longer life. Further, if the content of the internal crosslinking agent is more than 5% by mass, the binding property between active materials and between an active material and a collector will be reduced.

The polymer for binders may optionally comprise another monoethylenically unsaturated monomer (e) in addition to the above monomers (a) to (d). Specific examples of such a monomer include sodium p-toluene sulfonate, vinylpyrrolidone, vinylacetamide, N-alkyl (meth)acrylamide, N,N-dialkyl (meth)acrylamide, N-hydroxyalkyl(meth)acrylamide having an alkyl group having 1 to 3 carbon atoms, diacetone (meth)acrylamide, dimethylaminoalkyl (meth)acrylamide in which an alkyl group in a portion excluding a dimethylamino group has 1 to 5 carbon atoms, and (meth)acrylamide-2-methylpropanesulfonic acid. The content of another ethylenically unsaturated monomer (e) is 20% by mass or less, preferably 10% by mass or less, based on all the ethylenically unsaturated monomers.

Note that in the case where the polymer for binders has the polymerization unit of conjugated dienes such as butadiene and isoprene, if the amount of the binder used is reduced, a target effect in the present invention will not sufficiently be obtained, and therefore, the polymer for binders is preferably a polymer free of conjugated diene units which does not substantially have the polymerization unit of conjugated dienes.

Further, the ethylenically unsaturated monomers used in the emulsion polymerization may comprise a molecular weight modifier such as mercaptan, thioglycolic acid and an ester thereof, and β-mercaptopropionic acid and an ester thereof, in order to adjust the molecular weight of the polymer.

(Emulsion Polymerization)

The aqueous polymer emulsion used in the present invention is obtained by emulsion polymerization of the ethylenically unsaturated monomers as described above in an aqueous medium in the presence of a surfactant. The emulsion polymerization is performed in an aqueous medium using a radical polymerization initiator. Examples of the emulsion polymerization methods include a method in which all the components used for polymerization are collectively charged and polymerized and a method in which each component used for polymerization is continuously supplied and simultaneously polymerized. Among these methods, the method in which each component used for polymerization is continuously supplied and simultaneously subjected to emulsion polymerization is preferred because it enables obtaining fine binder particles having a uniform particle size and removing heat during reaction efficiently. The emulsion polymerization is generally performed at a temperature of 30 to 90° C. with stirring.

Examples of the surfactant used in the emulsion polymerization include, but are not particularly limited to, an anionic surfactant and a nonionic surfactant. Examples of the anionic surfactant include an alkylbenzenesulfonic acid salt, an alkylsulfuric ester salt, polyoxyethylene alkyl ether sulfuric ester salt, and a fatty acid salt. Examples of the nonionic surfactant include polyoxyethylene alkyl ether, polyoxyethylene alkyl phenyl ether, polyoxyethylene polycyclic phenyl ether, polyoxyalkylene alkyl ether, sorbitan fatty acid ester, and polyoxyethylene sorbitan fatty acid ester.

The above surfactants may be used singly or in combination of two or more. Further, when a surfactant having an ethylenically unsaturated bond represented by any of the following formulas (4) to (7) is used as a surfactant, the effect of improvement in the stability of particles will be exhibited.

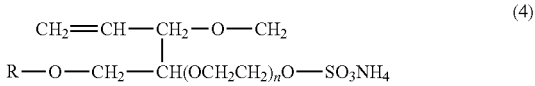

(4)

wherein R represents an alkyl group, and n represents an integer of from 10 to 40.

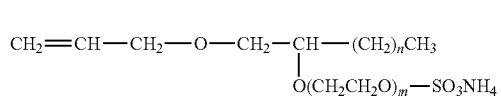

(5)

wherein n represents an integer of from 10 to 12, and m represents an integer of from 10 to 40.

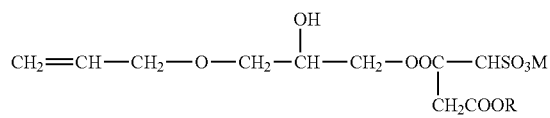

(6)

wherein R represents an alkyl group, and M represents $NH_4$ or Na.

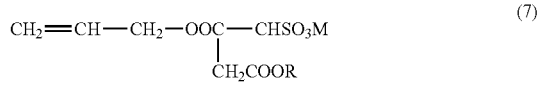

(7)

wherein R represents an alkyl group, and M represents Na.

The amount of the surfactant used is preferably 0.1 to 3 parts by mass based on 100 parts by mass of all the ethylenically unsaturated monomers. When the amount of the surfactant used is set to 0.1 part by mass or more, a stable emulsion can be efficiently produced, and the mechanical stability of the resulting aqueous polymer emulsion will be high. In addition, the size of particles contained in the aqueous polymer emulsion obtained by emulsion polymerization is small, and the settling of particles hardly occurs. When the amount of the surfactant used is set to 3 parts by mass or less, the adhesion between an active material and a collector tends to be improved. Note that although the surfactants as represented by the above formulas (4) to (7) each have an ethylenically unsaturated bond, these surfactants are not included in the "ethylenically unsaturated monomer" of the present invention.

The radical polymerization initiator used in the emulsion polymerization is not particularly limited, and a known radical polymerization initiator can be used. Examples of the radical polymerization initiator include ammonium persulfate, potassium persulfate, hydrogen peroxide, and t-butyl hydroperoxide. Further, the emulsion polymerization may optionally be redox polymerization in which a radical polymerization initiator is used in combination with a reducing agent such as sodium bisulfite, Rongalite, and ascorbic acid.

In the present invention, water is generally used as an aqueous medium, but a medium obtained by adding a hydrophilic solvent to water may be used as an aqueous medium unless the polymerization stability of the resulting binder is impaired. Examples of the hydrophilic solvent to be added to water include methanol, ethanol, and N-methylpyrrolidone.

The polymerization stability, mechanical stability, and chemical stability of the ethylenically unsaturated monomers during emulsion polymerization and/or the aqueous polymer emulsion after completion of emulsion polymerization may be improved by adding a basic substance during the emulsion polymerization performed to produce the aqueous polymer emulsion and/or after the completion of the emulsion polymerization to neutralize the ethylenically unsaturated carboxylic acid contained in the ethylenically unsaturated monomers and adjust pH. Examples of the basic substance to be used in this case include ammonia, triethylamine, sodium hydroxide, and lithium hydroxide. These basic substances may be used singly or in combination of two or more.

(Glass Transition Temperature)

The glass transition temperature (Tg) of the polymer for binders of the present embodiment is preferably from −55 to 30° C., more preferably from −25 to 25° C., most preferably from −20 to 10° C. When the Tg of the polymer for binders is in the above range, the binding property between active materials and between an active material and a collector will be developed, and a crack of the electrode obtained using a slurry comprising the binder composition and an active material can be easily prevented. If the Tg of the polymer for binders is less than −55° C., the binding property between active materials and between an active material and a collector will tend to be reduced. Further, if the Tg of the polymer for binders is higher than 30° C., a crack will easily occur in the electrode obtained by applying a slurry comprising the binder composition and an active material. The Tg of the polymer for binders can be adjusted by changing the content of styrene included in the ethylenically unsaturated monomers and the amount or type of the ethylenically unsaturated monomers.

The glass transition temperature of the polymer for binders of the present invention is a theoretical value calculated with good approximation by the following formula (I) from the glass transition temperature Tgi (i=1, 2, . . . , i) of each homopolymer of the ethylenically unsaturated monomer Mi (i=1, 2, . . . , i) to be used in the emulsion polymerization of the polymer for binders and each weight fraction Xi (i=1, 2, . . . , i) of the ethylenically unsaturated monomer Mi.

$$1/Tg = \Sigma(Xi/Tgi) \quad (I)$$

Note that the glass transition temperature Tgi used in this formula is the absolute temperature (K).

(Binder Composition for Nonaqueous Battery Electrodes)

The polymer component, which is the main component of the binder composition for nonaqueous battery electrodes, is obtained as an aqueous polymer emulsion in which the polymer is dispersed in an aqueous medium by emulsion polymerization of a monomer mixture in the aqueous medium. The binder composition is obtained by adding an acetylene glycol compound to the aqueous polymer emulsion and optionally adjusting the non-volatile matter concentration and pH. The content of the non-volatile matter of the binder composition is preferably from 20 to 60% by mass, more preferably from 30 to 50% by mass. The pH of the binder composition is preferably from 1.5 to 10, more preferably from 6 to 9. The viscosity of the binder composition in room temperature is preferably 1 to 5000 mPa·s. Note that the non-volatile matter in the present invention is calculated as a residue after weighing about 1 g of a sample in a plate-like container such as a dish or a plate and drying the sample at 105° C. for 1 hour.

"Slurry for Nonaqueous Battery Electrodes"

Next, the slurry for nonaqueous battery electrodes of the present invention will be described in detail. In the present specification, the slurry for nonaqueous battery electrodes is sometimes represented by "slurry" or a "slurry composition", but they all mean the same thing. The slurry of the present invention comprises the binder composition described above, an active material, and an aqueous medium and a thickener which are optionally mixed, and is prepared by dispersing or dissolving the polymer for binders, the active material, and the thickener which is an optional component in the aqueous medium.

The amount added of the binder composition included in the slurry in terms of non-volatile matter is preferably from 0.1 to 1.8 parts by mass, more preferably from 0.3 to 1.6 parts by mass, most preferably from 0.5 to 1.5 parts by mass, based on 100 parts by mass of the active material. If the amount used of the non-volatile matter of the binder composition is less than 0.1 part by mass, the binding property between an active material and a collector is poor, and the charge-discharge cycle property tends to be reduced; and if the amount used of the non-volatile matter of the binder composition is more than 1.8 parts by mass, the internal resistance of the battery will increase to reduce the initial capacity, and the charge-discharge cycle property tends to be reduced. Further, the amount of the acetylene glycol compound to be added to the slurry as one component of the binder composition is preferably from 1 to 100 ppm by mass, more preferably from 2 to 50 ppm by mass, based on the whole slurry.

The active material may be a material which can dope/dedope lithium or the like. When the slurry for nonaqueous battery electrodes is for forming a negative electrode, examples of the active material include conductive polymers such as polyacetylene and polypyrrole; cokes such as coke, petroleum coke, pitch coke, and coal coke; polymer charcoal; carbon fiber; carbon black such as acetylene black; graphite such as artificial graphite and natural graphite; lithium titanate; and silicon. Among these active materials, it is preferred to use carbon black, artificial graphite, natural graphite, lithium titanate, silicon, and the like from the point that the energy density per volume is high. Further, when the active material is a carbon material, specifically, cokes such as coke, petroleum coke, pitch coke, and coal coke; polymer charcoal; carbon fiber; carbon black such as acetylene black; and graphite such as artificial graphite and natural graphite, the effect of improving the binding property by the binder composition of the present invention is remarkable.

When the slurry for nonaqueous battery electrodes is for forming a positive electrode, the positive electrode active material is not particularly limited as long as it is a positive electrode active material that can be used for a nonaqueous battery, and lithium cobaltate ($LiCoO_2$); lithium composite oxides containing nickel such as a Ni—Co—Mn-based lithium composite oxide, a Ni—Mn—Al-based lithium composite oxide, and a Ni—Co—Al-based lithium composite oxide; spinel-type lithium manganate ($LiMn_2O_4$); olivine-type iron phosphate lithium; and charcogen compounds such as $TiS_2$, $MnO_2$, $MoO_3$, and $V_2O_5$ are used singly or in combination. Further, metal oxides in which other alkali metals are used can also be used.

The non-volatile matter concentration of the slurry is preferably from 30 to 70% by mass, more preferably from 40 to 60% by mass. Further, the viscosity of the slurry is preferably from 500 to 20,000 mPa·s, more preferably from 5,000 to 20,000 mPa·s. When the non-volatile matter and the viscosity of the slurry are in this range, the slurry provides good coatability to a collecting electrode plate and is excellent in the productivity of an electrode. The non-volatile matter concentration of the slurry is adjusted by the amount of an aqueous medium (dispersion medium). Further, the viscosity of the slurry is adjusted by the amount of a dispersion medium and a thickener. Generally, with respect to the dispersion medium, water or a hydrophilic solvent is further added to a dispersion medium derived from an aqueous polymer emulsion. Examples of the hydrophilic solvent include methanol, ethanol, and N-methylpyrrolidone.

Examples of the thickener include cellulose such as carboxymethyl cellulose, hydroxyethyl cellulose, and hydroxypropyl cellulose, and ammonium salts and alkali metal salts thereof, poly(meth)acrylic acid and ammonium salts and alkali metal salts thereof, poly(N-vinylacetamide) (PNVA), N-vinylacetamide (NVA)-sodium acrylate copolymers, polyvinyl alcohol, and polyvinylpyrrolidone. Among these thickeners, carboxymethyl cellulose and poly(meth) acrylic acid, and ammonium salts and alkali metal salts thereof, PNVA, and NVA-sodium acrylate copolymers are preferably used because a slurry in which an active material is dispersed can be easily produced.

The amount added of the thickener included in the slurry is preferably from 0.5 to 1.5 parts by mass based on 100 parts by mass of an active material. When the slurry comprises the thickener in the above amount, the coatability of the slurry will be improved, and the binding property between active materials and between an active material and a collector in the active material layer prepared by coating and drying the slurry will be further improved.

The method for preparing a slurry is not particularly limited, and a known method can be used. Examples include a method involving mixing a binder composition, an active material, an optional thickener, and an aqueous medium (dispersion medium) using a mixer such as a stirring mixer, a rotating mixer, and a shaking mixer. The pH of a slurry is preferably from 2 to 10, more preferably from 6 to 9, from the point of view of the durability of a battery and the like.

"Electrode for Nonaqueous Batteries"

The electrode (electrode for nonaqueous batteries) of the present invention is formed using the slurry described above. For example, the electrode can be produced by coating a collector with a slurry, drying the slurry to form an active material layer, and then cutting the coated collector to a suitable size.

Examples of the collector used for the electrode include, but are not particularly limited to, a collector made of metal, such as iron, copper, aluminum, nickel, and stainless steel. Further, the shape of the collector is not particularly limited, and a sheet having a thickness of from 0.001 to 0.5 mm is generally used.

The method of coating a collector with a slurry is not particularly limited, and a common coating method can be used. Examples include a reverse roll method, a direct roll method, a doctor blade method, a knife method, an extrusion method, a curtain method, a gravure method, a bar method, a dip method, and a squeeze method. Among these, it is preferred to use a doctor blade method, a knife method, or an extrusion method when various physical properties such as viscosity and drying characteristics of the slurry used for the nonaqueous battery electrode are taken into consideration, and a coating film having a satisfactory surface state can be obtained by using these methods.

The slurry may be applied only to one surface of a collector or may be applied to both surfaces thereof. When the slurry is applied to both surfaces of the collector, one surface may be applied before the other surface, or both surfaces may be applied at the same time. Further, the slurry may be continuously applied to the surface of a collector or may be applied with a predetermined time space by an intermittent coating method. The thickness, length, and width of a coating film prepared by applying the slurry can be suitably determined depending on the size of a battery and the like.

The method for drying the coating film prepared by applying the slurry to form an active material layer is not particularly limited, and a known method can be used. For example, as a drying method, hot wind, vacuum, (far) infrared rays, electron beams, and low-temperature wind may be used singly or in combination. The temperature for drying the coating film is generally in the range of from 40 to 180° C., and the drying time is generally from 1 to 30 minutes.

The collector in which the active material layer is formed is cut to a size and shape suitable as an electrode. The method for cutting the collector in which the active material layer is formed is not particularly limited, and, for example, a slit, a laser, wire cut, a cutter, a Thomson blade, and the like can be used.

The collector in which the active material layer is formed may be optionally pressed before or after cutting the collector, thereby capable of reducing the peeling of the active material and miniaturizing the nonaqueous battery by the reduction in thickness of the electrode. A common method can be used as a method of pressing, and particularly, a mold press method and a roll press method are preferably used. The pressing pressure is preferably, but not particularly limited to, from 0.5 to 5 t/cm$^2$, which is the range where the pressing does not influence the doping/dedoping of lithium ions or the like into the active material.

"Nonaqueous Battery"

The battery (nonaqueous battery) of the present invention comprises the electrode described above. The battery is prepared by receiving a positive electrode, a negative electrode, an electrolytic solution, and an optionally installed component such as a separator in an outer packaging body, and the electrode of the present invention can be used for one or both of the positive electrode and the negative electrode. Examples of the shape of the electrode include, but are not particularly limited to, a laminate and a wound body.

A nonaqueous solution having high ion conductivity can be used as the electrolytic solution. Examples of the solution include an organic solvent, an ionic liquid, and acetonitrile in which an electrolyte is dissolved.

A known alkali metal salt can be used as the electrolyte, and the electrolyte can be suitably selected depending on the type or the like of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and a lithium aliphatic carboxylate. Further, salts in which other alkali metals are used can also be used.

A known organic solvent or ionic liquid can be used without particular limitation as the organic solvent or ionic liquid for dissolving an electrolyte. Examples of the organic solvent include ethylene carbonate (EC), propylene carbonate (PC), diethyl carbonate (DEC), methylethyl carbonate (MEC), and dimethyl carbonate (DMC). Further, with respect to the ionic liquid, examples of the anion which is a constituting ion of the ionic liquid include N,N-bis(trifluoromethanesulfonyl)imide and fluorosulfonylimide, and examples of the cation which is the other constituting ion include 1-ethyl-3-methylimidazolium and N,N-dimethyl-N-ethyl-N-methoxyethylammonium. The anion and the cation can be suitably combined and used. These electrolytic solutions may be used singly or in combination of two or more.

A metal outer packaging body, an aluminum-laminated outer packaging body, and the like can be suitably used as the outer packaging body. The shape of the battery may be any shape, including a coin type, a button type, a sheet type, a cylinder type, a square type, and a flat type. The battery of the present embodiment can be produced using a known production method.

EXAMPLES

Hereinafter, the present invention will be described in further detail with reference to Examples and Comparative Examples, but the present invention is not limited to these. Note that "part", "%", and "ppm" in Examples and Comparative Examples represent "part by mass", "% by mass", and "ppm by mass", respectively, unless otherwise specified.

In the following Examples and Comparative Examples, Surfynol 104 was used as the acetylene glycol represented by the above formula (2), and Surfynol 440 was used as the ethylene oxide adduct thereof (both are trade names, manufactured by Nissin Chemical Industry Co., Ltd.).

The calculated Tg of the polymers for binders and the non-volatile matter of the binder compositions in Examples are as described above. In addition, the tests for evaluating the physical properties and the performance of binder compositions used in Examples and Comparative Examples and batteries obtained by using these binder compositions were performed by the following methods.

(Viscosity)

The viscosity was measured using a Brookfield type rotational viscometer at a solution temperature of 23° C. and a number of revolution of 60 rpm, using a No. 1, a No. 2, or a No. 3 rotor.

(Peel Strength Test of Electrode)

A slurry was applied to a collector formed from copper foil so that the coating amount after drying might be 7 mg/cm$^2$, dried by heating at 60° C. for 10 minutes, and then further dried at 120° C. for 10 minutes to obtain an electrode. The resulting electrode was allowed to stand at 23° C. and 50% RH (relative humidity) for 24 hours to obtain a test piece. In the peel strength test, a slurry-coated surface of the test piece and a stainless steel plate were bonded together using a double-sided tape and measured for 180° peel strength (peeling width: 25 mm, peeling rate: 100 mm/min).

(Peeling of Active Material During Cutting)

When the above electrode was cut with a cutter, it was visually observed whether the active material on the cut surface would be peeled off or not.

(Resistance Value)

In order to measure the cell resistance of a battery, the remaining capacity of the battery was first set to 0% by discharging the battery at a constant current (0.2 C) until the battery reached the lower limit voltage (2.75 V). Subsequently, the battery was subjected to constant-current/constant-voltage (CC-CV) charge [charged at a constant current (CC) (1 C) until the upper limit voltage (4.2 V) was reached and then charged at a constant voltage (CV) (4.2 V) until 1.5 hours have elapsed] and then discharged at CC (0.1 C) for 2 hours, thereby adjusting the remaining capacity of the battery to 80%. Subsequently, the battery was discharged at a constant current for 1 second at each current of 0.2 C, 0.5 C, 1 C, and 2 C, and the current value after 1 second was plotted on the axis of abscissas and the voltage was plotted on the axis of ordinates. A straight line was drawn from the resulting plot by a linear approximation method, and the inclination of the straight line was defined as the resistance value. This measurement was performed at a temperature of 25° C. A battery having a resistance value of 3.9Ω or less was regarded as satisfactory.

(Charge-Discharge Cycle Property)

The charge-discharge cycle test of a battery was performed at a temperature of 25° C. by repeating CC-CV charge [charged at CC (1 C) until the upper limit voltage (4.2 V) was reached and then charged at CV (4.2 V) until 1.5 hours have elapsed] and CC discharge [discharged at CC (1 C) until the lower limit voltage (2.75 V) was reached]. The capacity retention, that is, the ratio of the discharge capacity at the 300th cycle to the discharge capacity at the first cycle, was defined as an index of the charge-discharge cycle property of a battery. A battery having a capacity retention of 80% or more is regarded as a battery having a satisfactory charge-discharge cycle property.

Comparative Example 1

(Preparation of Binder Composition A)

A separable flask equipped with a cooling tube, a thermometer, a stirrer, and a dropping funnel was charged with 175 parts by mass of water and 3 parts by mass of 40% ELEMINOL JS-20 (manufactured by Sanyo Chemical Industries, Ltd.; a compound having a structural formula of the above formula (5)) as an anionic surfactant and heated to a temperature of 75° C. Subsequently, a surfactant, a monomer mixture, and a polymerization initiator previously prepared were dropwise added to the separable flask with stirring at 80° C. over 3 hours to perform emulsion polymerization.

A surfactant containing 10 parts by mass of 40% ELEMINOL JS-20 and 2 parts by mass of HITENOL 08E (manufactured by Dai-Ichi Kogyo Seiyaku Co., Ltd.; polyoxyethylene alkyl ether sulfuric ester salt) was used as the surfactant which was dropwise added to the separable flask. A monomer mixture having the composition shown in Table 1, that is, a monomer mixture containing 260 parts by mass of styrene (ST), 220 parts by mass of 2-ethylhexyl acrylate (2-EHA), 10 parts by mass of 2-hydroxyethyl methacrylate (HEMA), 1.5 parts by mass of divinylbenzene (DVB), 10 parts by mass of itaconic acid (IA), and 15 parts by mass of a 80% acrylic acid (AA) aqueous solution was mixed with 525 parts by mass of water, which was emulsified and used as the monomer mixture. The composition ratio of each monomer is as described in Table 1. A polymerization initiator prepared by dissolving 2 parts by mass of potassium persulfate in 50 parts by mass of water was used as the polymerization initiator.

After dropwise adding the surfactant, the monomer mixture, and the polymerization initiator, the resulting mixture was aged at 80° C. for 2 hours with stirring. Subsequently, the mixture was cooled and then neutralized by adding 17 parts by mass of aqueous ammonia to the separable flask, thereby obtaining a binder composition A comprising a polymer a. The resulting polymer a had a Tg of −2° C., and the binder composition A had a non-volatile matter concentration of 40.0%, a viscosity of 120 mPa·s, and a pH of 7.1.

(Production of Electrode for Nonaqueous Batteries)

One hundred parts by mass of graphite (manufactured by Showa Denko K.K., registered trademark SCMG-BR) as an active material, 2 parts by mass of acetylene black as a conductive aid, and 1 part by mass of carboxymethyl cellulose-sodium salt (manufactured by Nippon Paper Chemicals Co., Ltd., product name SUNROSE MAC500LC) as a thickener were weighed, and thereto was added a small amount of water. The mixture was subjected to thick-kneading for 20 minutes at 60 revolutions per minute using a stirring mixer (planetary mixer). Next, the above binder composition A was added to the kneaded mixture so that the non-volatile matter of the composition might be 1.5 parts, and thereto was added additional water so that the total amount of the previously added water and the additional water might be 104.5 parts by mass based on 105 parts by mass of the sum of the graphite, the acetylene black, the carboxymethyl cellulose-sodium salt, and the binder composition. The resulting mixture was further mixed for 20 minutes at 60 revolutions per minute, thereby producing a slurry for a negative electrode.

The resulting slurry for a negative electrode was applied to one surface of copper foil having a thickness of 18 μm serving as a collector using a doctor blade so that the coating amount after drying might be 7 mg/cm$^2$, dried by heating at 60° C. for 10 minutes, and further dried at 120° C. for 10 minute, thus forming an active material layer. Subsequently, a negative electrode was obtained through a pressing step at a pressing pressure of 4 t/cm$^2$ using a mold press. The negative electrode obtained in this way was observed for the peeling state of the active material layer during cutting and measured for the peel strength of a collector.

(Production of Lithium Ion Secondary Battery)

Next, a lithium ion secondary battery was produced as follows using the above negative electrode. A positive electrode produced in the following procedures was used as a positive electrode to be combined with the negative electrode. To a mixture of 90% by mass of $LiCoO_2$, 5% by mass of acetylene black as a conductive aid, and 5% by mass of polyvinylidene fluoride as a binder, was added 100% by mass of N-methylpyrrolidone followed by mixing to produce a slurry for a positive electrode. The resulting slurry for a positive electrode was applied to aluminum foil having a thickness of 20 μm serving as a collector by a doctor blade method so that the thickness after roll press treatment might be 100 μm and dried at 120° C. for 5 minutes. Subsequently, a positive electrode was obtained through a pressing step.

Further, an electrolytic solution to be used for a lithium ion secondary battery was prepared by dissolving $LiPF_6$ in a mixed solvent prepared by mixing ethylene carbonate (EC) with diethyl carbonate (EMC) at a volume ratio of 40:60 so that the concentration of $LiPF_6$ might be 1.0 mol/L.

A conductive tab was attached to each of the resulting positive electrode and negative electrode; a separator made of a polyolefin porous film was allowed to intervene between the positive electrode and the negative electrode; and they were received in an aluminum laminated outer packaging body (battery pack) so that the active material of the positive electrode and the active material of the negative electrode are opposite to each other. The electrolytic solution was injected into the outer packaging body, which was packed with a vacuum heat sealer to obtain a laminate type battery. The battery obtained in this way was measured for the resistance value and the charge-discharge cycle property. The evaluation results on the above negative electrode and lithium ion secondary battery are shown in Table 1.

Examples 1 to 3

An acetylene glycol compound shown in Table 1 was added to the binder composition A prepared in Comparative Example 1 so that the amount of the acetylene glycol compound might be 0.12 part per 100 parts of the non-volatile matter of the binder composition A, thus obtaining binder compositions B and C. The binder composition B had a non-volatile matter content of 40.1%, a viscosity of 120 mPa·s, and a pH of 7.2, and the binder composition C had a non-volatile matter content of 40.1%, a viscosity of 120 mPa·s, and a pH of 7.1. Further, the amount of the acetylene glycol compound contained in the binder compositions B and C was about 500 ppm, respectively.

Next, the slurries for the negative electrode were prepared in the same manner as in Comparative Example 1 except that these binder compositions were used in the amounts shown in Table 1, specifically, in the amounts in which the non-volatile matter of the binder composition was 1.5 part or 0.75 part per 100 parts of the active material. The amount of the acetylene glycol compound in the slurries was about 9 ppm in the case of Example 1 and Example 3 and about 5 ppm in the case of Example 2. Next, the resulting slurries were used to manufacture negative electrodes and lithium ion secondary batteries in the same manner as in Comparative Example 1, and the performance thereof was evaluated. The results are shown in Table 1.

Comparative Examples 2 to 3

Binder compositions M and N were prepared in the same manner as in Example 1 except that the amount of the acetylene glycol compound added was changed as shown in Table 1. Negative electrodes and lithium ion secondary batteries were manufactured in the same manner as in Comparative Example 1 using the binder compositions, and the performance thereof was evaluated. The results are shown in Table 1.

Comparative Example 4

A negative electrode and a lithium ion secondary battery were manufactured in the same manner as in Example 1 except that the amount of the binder composition B used was increased to twice the amount, that is, the amount of the non-volatile matter in the binder composition was increased to 3 parts per 100 parts of the active material, and the performance thereof was evaluated. The results are shown in Table 1.

Comparative Examples 5 to 8

A commercially available styrene-butadiene copolymer (SBR) latex (having a non-volatile matter content of 40.0%, a viscosity of 49 mPa·s, a pH of 7.7, and a Tg of −12° C.) was used as a binder composition D. Further, the compounds shown in Table 1 were each added as an acetylene glycol compound to obtain binder compositions E and F. Next, negative electrodes and lithium ion secondary batteries were manufactured in the same manner as in Comparative Example 1 except that these binder compositions were used in the amount shown in Table 1, and the performance thereof was evaluated. The results are shown in Table 1.

Comparative Examples 9 to 14

Binder compositions G to L were obtained in the same manner as in Example 1 except that the composition of the polymers used as a binder was changed to that of polymers g to 1 shown in Table 1. Next, negative electrodes and lithium ion secondary batteries were manufactured in the same manner as in Comparative Example 1 except that these binder compositions were used in the amount shown in Table 1, and the performance thereof was evaluated. The results are shown in Table 1.

Comparative Example 15

A binder composition 0 was obtained in the same manner as in Example 1 except that a polyether nonionic surfactant (SN Wet 980, manufactured by SAN NOPCO LIMITED) having a structure in which ethylene oxide is added to a hydroxy group was used instead of Surfynol 440. Note that this surfactant has a chemical structure similar to Surfynol 440 used in Example 1, but it is different from Surfynol 440 in that it does not have an acetylene skeleton in the molecule. Next, a negative electrode and a lithium ion secondary battery were manufactured in the same manner as in Comparative Example 1 except that the binder composition was used in the amount shown in Table 1, and the performance thereof was evaluated. The results are shown in Table 1.

TABLE 1

| | Binder composition | Polymer for binder | Polymer composition for binder (%) ST | 2-EHA | HEMA | DVB | IA | Tg (° C.) | Additive | Amount added *1 |
|---|---|---|---|---|---|---|---|---|---|---|
| Example 1 | B | Polymer a | 51.8 | 43.9 | 2.0 | 0.3 | 2.0 | −2 | Compound 2 *2 | 0.12 |
| Example 2 | B | Polymer a | 51.8 | 43.9 | 2.0 | 0.3 | 2.0 | −2 | Compound 2 | 0.12 |
| Example 3 | C | Polymer a | 51.8 | 43.9 | 2.0 | 0.3 | 2.0 | −2 | Compound 1 *3 | 0.12 |
| Comparative Example 1 | A | Polymer a | 51.8 | 43.9 | 2.0 | 0.3 | 2.0 | −2 | None | — |
| Comparative Example 2 | M | Polymer a | 51.8 | 43.9 | 2.0 | 0.3 | 2.0 | −2 | Compound 2 | 0.01 |
| Comparative Example 3 | N | Polymer a | 51.8 | 43.9 | 2.0 | 0.3 | 2.0 | −2 | Compound 2 | 0.75 |
| Comparative Example 4 | B | Polymer a | 51.8 | 43.9 | 2.0 | 0.3 | 2.0 | −2 | Compound 2 | 0.12 |
| Comparative Example 5 | D | SBR | | | | | | | None | — |
| Comparative Example 6 | E | SBR | | | | | | | Compound 2 | 0.12 |
| Comparative Example 7 | E | SBR | | | | | | | Compound 2 | 0.12 |
| Comparative Example 8 | F | SBR | | | | | | | Compound 1 | 0.12 |
| Comparative Example 9 | G | Polymer g | 10.0 | 85.7 | 2.0 | 0.3 | 2.0 | −50 | Compound 2 | 0.12 |
| Comparative Example 10 | H | Polymer h | 79.8 | 16.0 | 2.0 | 0.3 | 2.0 | 55 | Compound 2 | 0.12 |
| Comparative Example 11 | I | Polymer i | 52.5 | 44.4 | 2.0 | 0.3 | 0.7 | −2 | Compound 2 | 0.12 |
| Comparative Example 12 | J | Polymer j | 46.3 | 39.2 | 1.8 | 0.3 | 12.5 | 3 | Compound 2 | 0.12 |
| Comparative Example 13 | K | Polymer k | 52.0 | 44.0 | 2.0 | 0.0 | 2.0 | −2 | Compound 2 | 0.12 |
| Comparative Example 14 | L | Polymer l | 49.1 | 41.5 | 1.9 | 5.7 | 1.9 | 3 | Compound 2 | 0.12 |
| Comparative Example 15 | O | Polymer a | 51.8 | 43.9 | 2.0 | 0.3 | 2.0 | −2 | Compound 3 *4 | 0.12 |

| | Properties of binder composition | | | Amount of binder in slurry (parts) | Electrode | Peeling of active material layer during cutting | Collector peel strength (mN/mm) | Battery | | Charge-discharge cycle property (%) |
|---|---|---|---|---|---|---|---|---|---|---|
| | Non-volatile matter concentration (%) | Viscosity (mPa · s) | pH | | | | | Battery | Resistance value [Ω] | |
| Example 1 | 40.1 | 120 | 7.2 | 1.5 | A | Not observed | 17 | A | 2.4 | 84 |
| Example 2 | 40.1 | 120 | 7.2 | 0.75 | B | Not observed | 12 | B | 1.9 | 81 |
| Example 3 | 40.1 | 120 | 7.1 | 1.5 | C | Not observed | 14 | C | 2.7 | 82 |
| Comparative Example 1 | 40.0 | 120 | 7.1 | 1.5 | D | Not observed | 10 | D | 3.2 | 76 |
| Comparative Example 2 | 40.1 | 122 | 7.2 | 1.5 | E | Not observed | 10 | E | 2.9 | 76 |
| Comparative Example 3 | 40.2 | 135 | 7.2 | 1.5 | F | Not observed | 18 | F | 3.1 | 75 |
| Comparative Example 4 | 40.0 | 120 | 7.2 | 3.0 | G | Not observed | 26 | G | 4.1 | 78 |
| Comparative Example 5 | 40.0 | 49 | 7.7 | 1.5 | H | Observed | 8 | H | 4.9 | 73 |
| Comparative Example 6 | 40.1 | 58 | 7.2 | 1.5 | I | Observed | 8 | I | 4.7 | 72 |
| Comparative Example 7 | 40.0 | 58 | 7.2 | 0.75 | J | Observed | 6 | J | 3.5 | 69 |
| Comparative Example 8 | 40.1 | 61 | 7.3 | 1.5 | K | Observed | 7 | K | 4.6 | 71 |
| Comparative Example 9 | 40.2 | 860 | 7.4 | 1.5 | L | Observed | 8 | L | 3.2 | 67 |
| Comparative Example 10 | 40.2 | 40 | 7.1 | 1.5 | M | Observed | 7 | M | 4.5 | 71 |
| Comparative Example 11 | 40.2 | 124 | 7.5 | 1.5 | N | Observed | 4 | N | 3.1 | 76 |
| Comparative Example 12 | 40.7 | 170 | 7 | 1.5 | O | Observed | 8 | O | 4.1 | 74 |
| Comparative Example 13 | 39.9 | 210 | 7 | 1.5 | P | Not observed | 12 | P | 5.2 | 63 |

TABLE 1-continued

| | | | | | | | | | | |
|---|---|---|---|---|---|---|---|---|---|---|
| Comparative Example 14 | 41.3 | 115 | 7.2 | 1.5 | Q | Observed | 5 | Q | 2.8 | 73 |
| Comparative Example 15 | 40.2 | 126 | 7.2 | 1.5 | R | Not observed | 11 | R | 3.2 | 76 |

*1 Amount added per 100 parts of non-volatile matter of polymer emulsion
*2 Acetylene glycol derivative Surfynol 440 (manufactured by Nissin Chemical Industry Co., Ltd.)
*3 Acetylene glycol Surfynol 104 (manufactured by Nissin Chemical Industry Co., Ltd.)
*4 Nonionic surfactant SN Wet 980 (manufactured by SAN NOPCO LIMITED)

The comparison between Examples 1 to 3 and Comparative Examples 1 to 15 shows the following.

(1) Even when the usage ratio of the binder composition of the present invention to an active material is small, the active material is not peeled off during cutting of the resulting electrode, and the binder composition is also excellent in the collector peel strength test. Further, the battery prepared from the binder composition has a small resistance value and exhibits an excellent cycle property in the charge and discharge cycle test over 300 cycles.

(2) On the other hand, when a binder composition does not contain an acetylene glycol compound or has a small content thereof, an improvement in the collector peel strength is not observed, and the battery prepared from the binder composition has an insufficient resistance value and an insufficient charge-discharge cycle property (refer to Comparative Examples 1 and 2). Conversely, when the content of the binder composition is excessively high, the collector peel strength is improved, but the battery prepared from the binder composition has an insufficient resistance value and an insufficient charge-discharge cycle property (refer to Comparative Example 3).

(3) When the composition of the polymer for binders is outside the range of the present invention, the effect of the present invention cannot be generated (refer to Comparative Examples 9 to 14).

(4) When the amount of the binder composition used is increased, the collector peel strength is largely improved, but the battery prepared from the binder composition has a high resistance value and an insufficient charge-discharge cycle property (refer to Comparative Example 4).

(5) When SBR known as a water-dispersed binder is used, the peeling of the active material occurs during cutting of the electrode even when an acetylene glycol compound is added, and the collector peel strength is also insufficient. Further, the battery prepared from the binder composition has a high resistance value, and a satisfactory cycle property is not obtained in the charge and discharge cycle test over 300 cycles (refer to Comparative Examples 5 to 8).

INDUSTRIAL APPLICABILITY

The binder composition for nonaqueous battery electrodes of the present invention is excellent in the binding property between active materials and between an active material and a collector as compared with conventional water-dispersed binders, and even when the binder composition is used in a small amount, the risk for an active material to be peeled off from a collector surface in the collector cutting step for producing an electrode will be reduced. Further, since the nonaqueous battery obtained by using the nonaqueous dispersed binder composition has a low resistance value and exhibits an excellent cycle property even in the charge and discharge cycle test under a severe condition of 300 cycles, the battery is suitable not only as a power source for notebook personal computers, mobile telephones, electric power tools, and electronic communications equipment, but also as a power source for electric vehicles, hybrid electric vehicles, and the like.

The invention claimed is:

1. A binder composition for nonaqueous battery electrodes, the composition being prepared by adding one or more acetylene glycol compounds selected from the group consisting of compounds represented by the following formula (1):

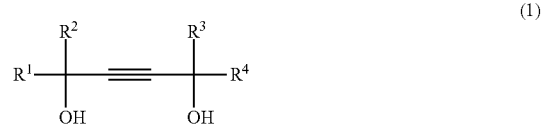

wherein $R^1$ to $R^4$ each independently represent a hydrogen atom or an alkyl group having from 1 to 8 carbon atoms and derivatives thereof, to an aqueous polymer emulsion,
wherein the aqueous polymer emulsion is obtained by emulsion polymerization of a monomer mixture comprising from 15 to 70% by mass of styrene (a), from 20 to 80% by mass of an ethylenically unsaturated carboxylate (b), from 1 to 10% by mass of an ethylenically unsaturated carboxylic acid (c), from 0.1 to 5% by mass of a crosslinkable ethylenically unsaturated monomer (d), and from 0 to 20% by mass of another monoethylenically unsaturated monomer (e), and
from 0.02 to 0.7 part by mass of the one or more acetylene glycol compounds is added to 100 parts by mass of non-volatile matter of the aqueous polymer emulsion.

2. The binder composition for nonaqueous battery electrodes as claimed in claim 1, wherein the compound represented by the formula (1) is a compound represented by the following formula (2):

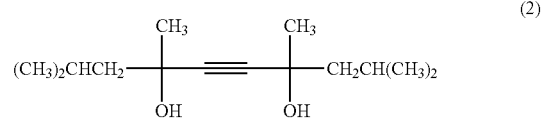

3. The binder composition for nonaqueous battery electrodes as claimed in claim 1, wherein the acetylene glycol compound is a compound in which an alkylene oxide having from 2 to 4 carbon atoms or an oligomer thereof is added to the compound represented by the formula (1).

4. The binder composition for nonaqueous battery electrodes as claimed in claim 3, wherein the oligomer has a degree of polymerization of from 2 to 40.

5. The binder composition for nonaqueous battery electrodes as claimed in claim 3, wherein the alkylene oxide is ethylene oxide.

6. The binder composition for nonaqueous battery electrodes as claimed in claim 1, wherein the content of non-volatile matter of the binder composition is from 5 to 70% by mass.

7. The binder composition for nonaqueous battery electrodes as claimed in claim 1, wherein at least a part of the ethylenically unsaturated carboxylate (b) is an ethylenically unsaturated carboxylate having a polar group.

8. The binder composition for nonaqueous battery electrodes as claimed in claim 7, wherein the polar group is a hydroxy group or a glycidyl group.

9. The binder composition for nonaqueous battery electrodes as claimed in claim 1, wherein the electrode is a negative electrode.

10. A slurry for nonaqueous battery electrodes comprising an electrode active material and a binder composition as claimed in claim 1, wherein the electrode active material/the non-volatile matter of the binder composition (mass ratio) is from 100/0.1 to 100/1.8.

11. The slurry for nonaqueous battery electrodes as claimed in claim 10, wherein the electrode active material/ the non-volatile matter of the binder composition (mass ratio) is from 100/0.3 to 100/1.6.

12. The slurry for nonaqueous battery electrodes as claimed in claim 10, wherein the content of the acetylene glycol compound is from 1 to 100 ppm by mass in the total amount of the slurry.

13. The slurry for nonaqueous battery electrodes as claimed in claim 10, wherein the content of the acetylene glycol compound is from 2 to 50 ppm by mass in the total amount of the slurry.

14. The nonaqueous battery electrode formed by using the slurry for nonaqueous battery electrodes as claimed in claim 10.

15. A nonaqueous battery comprising the nonaqueous battery electrode as claimed in claim 14.

* * * * *